United States Patent [19]

Clasen et al.

[11] Patent Number: 4,680,047
[45] Date of Patent: Jul. 14, 1987

[54] METHOD FOR THE MANUFACTURE OF GLASS BODIES

[75] Inventors: Rolf Clasen; Heinz Scholz, both of Aachen, Fed. Rep. of Germany

[73] Assignee: U.S. Philips Corporation, New York, N.Y.

[21] Appl. No.: 817,320

[22] Filed: Jan. 9, 1986

[30] Foreign Application Priority Data

Mar. 29, 1985 [DE] Fed. Rep. of Germany ....... 3511449

[51] Int. Cl.$^4$ .......................................... C03B 37/016
[52] U.S. Cl. .............................................. 65/17; 65/2; 65/3.11; 65/18.3; 65/35; 156/DIG. 108; 264/23; 501/12
[58] Field of Search ..................... 65/2, 3.11, 3.12, 17, 65/18.1, DIG. 16, 18.3, 18.4, 35; 501/12; 156/DIG. 108; 264/23

[56] References Cited

U.S. PATENT DOCUMENTS

| 3,038,199 | 6/1962 | Bartow et al. | 264/104 X |
| 4,417,910 | 11/1983 | Passaret | 65/18.4 X |
| 4,419,115 | 12/1983 | Johnson et al. | 65/3.12 |
| 4,574,063 | 3/1986 | Scherer | 501/12 X |

FOREIGN PATENT DOCUMENTS

| 59-131538 | 7/1984 | Japan | 65/18.1 |
| 59-152235 | 8/1984 | Japan | 65/2 |
| 60-54928 | 3/1985 | Japan | 65/17 |

Primary Examiner—Robert L. Lindsay
Attorney, Agent, or Firm—Norman N. Spain

[57] ABSTRACT

A method for the manufacture of glass bodies, in which a thixotropic suspension, being the starting material for the glass body, is used to form a porous green body which is subsequently purified and sintered, the starting material being liquefied in a mould by subjecting it to mechanical forces, and subsequently freeing it of the influence of the said forces, after which it solidifies again to form a green body.

17 Claims, 4 Drawing Figures

METHOD FOR THE MANUFACTURE OF GLASS BODIES

BACKGROUND OF THE INVENTION

The invention relates to a method for the manufacture of glass bodies, in which method a thixotropic suspension, being the starting material for the glass body, is used to form a porous green body which is subsequently purified and sintered.

The invention further relates to arrangements for carrying out such a method as well as to the use of the glass bodies manufactured by the method in accordance with the invention.

The method mentioned in the opening paragraph is particularly suitable for the manufacture of preforms for optical waveguides.

For the manufacture of very pure quartz-glass bodies, particularly preforms for optical waveguides, methods are known in which a porous glass body known as a green body is manufactured from microdispersed $SiO_2$ glass particles, after which the said green body is first purified in, for example, a chlorine-containing atmosphere at temperatures ranging from 600° to 900° C. Next, the green body is sintered at a temperature of approximately 1500° C. to form compact and transparent glass the sintering temperature depends upon the size of the $SiO_2$ particles and the homogeneity of the green body.

Processing the microdispersed quartz-glass particles involves a substantial investment in equipment (preforms for the manufacture of a green body which is easy to manipulate and presses to compact this green body) in order to obtain a green body having a density which is so high as to enable an efficient sintering process, i.e. sintering at temperatures $\leq 1550°$ C. to form a glass body which is free from bubbles and reams. Such a method for the manufacture of a preform for optical waveguides is known from DE-PS No. 32 40 355, for example.

GB-PS No. 1 010 702 describes a method in which quartz-glass fibers or quartz-glass rods are manufactured by means of an extrusion moulding process. For this purpose an $SiO_2$ suspension is brought to a gel state, which state is such that a very viscous substance is formed which can immediately be processed further in an extrusion moulding process.

BRIEF SUMMARY OF THE INVENTION

It is an object of the invention to provide a method and arrangements for the manufacture of high-purity glass bodies by means of which a green body of such porosity is obtained that the said green body can in an intermediate heating stage be thoroughly purified in a gaseous atmosphere which reacts with the impurities present, which green body, however, already has such a high density that the subsequent sintering process can be carried out without any additional compacting operation.

This object is achieved by a method in accordance with the invention, in which the gelled starting material is liquefied in a mould by subjecting it to mechanical forces, and subsequently freeing it of the influence of the said forces, after which it solidifies again to form a green body.

DETAILED DESCRIPTION OF THE INVENTION

Figure 1A:
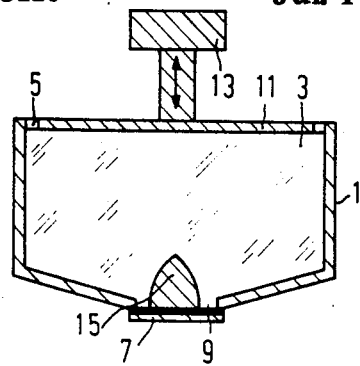
FIGS. 1a and 1b are cross-sectional views of an arrangement for carrying out the method of the invention.

Novel arrangements for carrying out the method of the invention include the following:

a receptacle for the starting material from which a glass body is manufactured, which receptacle has a feed opening perpendicularly opposite of which there is an outlet for the material in the receptacle, which outlet can be shut off by a cover and the cross-section of which defines the shape of the glass body to be made. This said receptacle also has a plunger which fits in the feed opening, is coupled to a sound generator or ultrasonic generator, contacts the basic material in the receptacle and can be moved in the direction of the outlet.

a vessel to which a sound generator or a ultrasonic generator is coupled, which comprises a medium in which a sound field or ultrasonic field can be produced and in which a mould can be introduced which accommodates the starting material thereby defining the shape of the glass body to be manufactured and a mould which defines the shape of the glass body to be manufactured, having a feed opening and perpendicularly opposite thereof an outlet, and a lining which is in contact with the inner wall of the said mould and which is closed at its bottom end at the location of the outlet of the mould in which lining-bounded space the starting material for the glass body can be introduced and which can be shut off at its open upper end by a plunger which fits in the lined mould, thereby matchingly contacting the basic material, and which is coupled to a sound generator or ultrasonic generator.

In accordance with advantageous variants of the method in accordance with the invention, a suspension is used as the starting material for the glass body, which suspension comprises $SiO_2$ particles having a diameter in the range from 10 to 500 nm, preferably between 15 and 100 nm, the average diameter being 40 nm at a weight ratio between solid matter and water from 1:1 to 2.5:1. Further an ionogenic additive is added to the suspension causing the pH-value of the suspension to move towards acidity (pH<3), for example, with hydrochloric acid HCl, or towards alkalinity (pH from 5.5 to 8). This has the advantage that adding an ionogenic additive in an amount between 0.2 and 5% by weight of the solids content of the suspension results in a very high thixotropy effect and that by means of such a starting material green bodies can be obtained having an advantageously high density which is desirable for an efficient sintering process of the green body.

Further according to the invention a very high thixotropy effect is obtained in particular with aqueous suspensions of submicroscopic $SiO_2$ particles having a diameter between 10 and 500 nm, preferably between 15 and 100 nm, by adding between 0.2 and 5% by weight (of the solids content of the suspension) of an ionogeneic substance which moves th pH-value of the suspension towards acidity (pH<3) or towards alkalinity (pH 5.5 to 8), which effect may be used when liquefying the starting material for the glass body to be produced by means of mechanical forces, preferably sound or ultrasonics, and to homogenize, compact and simultaneously deform the liquid-state starting material, the deformation being preserved since the starting material solidifies again due to the thixotropy effect.

In accordance with a further advantageous embodiment of the method in accordance with the invention, an aqueous solution of $NH_3$ is used as an ionogenic additive. This additive is very volatile and can be fully removed from the green body in a subsequent purifying-heating step, so that very pure quartz-glass bodies can be produced.

When in accordance with a further advantageous embodiment of the method in accordance with the invention, such an amount of ionogenic additive is added to the suspension that a very viscous solid mass is obtained, the advantage is obtained that the starting material will, prior to its liquefaction by means of mechanical forces, first be efficiently homogenized using a roller, a kneading device or the like and, for example, that the homogenized starting material can be led into a moulding arrangement by means of worm conveyors.

In the place of water, other dispersing fluids may be used, for example, mixtures of water and alcohol, for example, ethanol.

In accordance with a further advantageous embodiment of the method according to the invention, the starting material is liquefied by means of sound (frequency $f=20-200$ Hz) or ultrasonics (frequency $f=20-50$ kHz). In the case of thixotropic systems, any type of mechanical operation, for example, stirring or shaking included, that will lead to a gel to sol conversion may be employed. If, however, a sound generator or an ultrasonic generator is used whose amplitude is such that a sound field or ultrasonic field is produced in the basic material to be liquefied, the resultant cavities in the basic material are removed in a very effective way (gas bubbles rise to the surface in the liquefied starting material). The degassing process can be accelerated, for example, by liquefying the starting material in vacuo.

In accordance with a further advantageous embodiment of the method according to the invention, the starting material is deformed in an arrangement comprising a receptacle in which the said starting material is liquefied and which has an outlet which defines the shape of the glass body to be produced. An additional advantage of this embodiment is that, for example, tubes or rods can be manufactured in a continuous paste extrusion flow process.

However, if in accordance with a further advantageous embodiment of the method according to the invention, the starting material is first liquefied in a disposable mould, which mould is destroyed after the starting material has solidified, and then solidified in the said mould by stopping the mechanical forces responsible for the liquefaction, moulds may be used, for example, synthetic-resin hoses, which lead to a very smooth polished surface of the green body having a surface roughness of $\leq 1$ $\mu$m, preferably $\leq 0.5$ $\mu$m. Surfaces having such a low degree of surface roughness reduce the possibility of unwanted recrystallisation of the purified green body during sintering. However, for example, water permeable hoses, as they are used in dialysis processes, may alternatively be used as disposable moulds, thus making it possible to dry the green body by evaporation of the water content.

A further advantage of the invention is that green bodies for the manufacture of glass bodies, particularly preforms for optical waveguides, can be obtained with only very few equipment, which green bodies are on the one hand sufficiently porous so that it is possible to effectively remove impurities, particularly water and transition metals, in a heated gas atmosphere and on the other hand have such a high density and homogeneity that they can be sintered to form very pure glass bodies without the necessity of any intermediate treatments such as, for example, hot isostatic pressing.

Thanks to the above-described way of preparing the starting material which is liquefied by making use of the thixotropy effect, green bodies which are manufactured in a continuous process can be deformed in a simple way almost without applying pressure. Thus, the present method and arrangements are very different from the known extrusion-moulding methods.

A further advantage is that it is also possible to produce green bodies having other than circular cross-sections, for exanple, angular tubes or rods.

The invention will now be described by way of examples of embodiments.

First an embodiment of the method in accordance with the invention will be described with reference to FIGS. 1a and 1b. A very viscous starting material 3 which is homogenized in a kneading machine is introduced into a receptacle 1 having a feed opening 5 and an outlet 9, and is brought into contact with plunger 11 which plunger fits in the feed opening 5 and is coupled to a sound generator ($f=50$ Hz) or to an ultrasonic generator 13 ($f=35$ kHz). The arrangement shown in these figures is provided with an inner core 15 for the manufacture of tubular green bodies; if the inner core 15 is left out, the green bodies produced will be rod-shaped. Through the sound generator or ultrasonic generator 13, a sound field or ultrasonic field is applied to the very viscous starting material 3 which is sheared so that lowest possible viscosity is attained. In this respect, it is important that the amplitude of the sound generator suffices to suitably couple the sound field or ultrasonic field into the basic material. The measures necessary in this respect are known to those skilled in the art. Any cavities present in the mechanically liquefied starting material are readily removed, for example, as gas bubbles rising to the surface. This process can be accelerated by producing a vacuum. The FIGS. 1a and 1b do not show a separate vacuum arrangement.

Figure 1B:
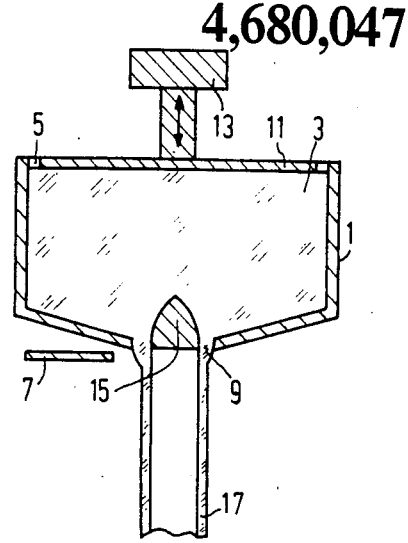

When the starting material 3 has reached a homogeneous low-viscous state, a closing element 7 in front of the outlet 9 is opened and the liquefied starting material 3 flows unpressurized from the outlet 9 (see FIG. 1b). The cross-section of the oulet 9 determines the cross-section of the green body to be manufactured; in FIG. 1b the green body 17 is tubular. The plunger 11 is controlled so that there is always a suitable contact between said plunger and the starting material 3 in receptacle 1. As a result of a decreasing degree of coupling of the sound field or ultrasonic field to the outgoing green body 17, the green body solidifies sufficiently quickly, due to a higher viscosity, for the shape of the said green body to be stablilized. Due to the fact that the green body 17 comprises no more sheared particles, the green body reaches such a degree of solidity that it can be handled and transported without any problems. Prior to undergoing a further treatment, the still moist green bodies, for example in the form of rods or tubes, must be subjected to a drying process with great care in order to prevent the development of cracks. This can be done in a known manner by slowly drying them in air, i.e. by heating them at an initially high air humidity followed by an exchange of solvents. Subsequently, the dried green body is purified in a chlorine-containing atmosphere at temperatures ranging from 600° to 900° C., next, the green body is sintered to form transparent glass, in a helium atmosphere to which about 2% by volume of chlorine gas is added, at a temperature of about 1500° C. A preform from which optical waveguides can be drawn having a step refractive index profile may be obtained by treating differently-doped tubes or by sealing-in a doped rod in an undoped cladding-glass tube. It is also possible to produce an optical waveguide having a W-shaped shaped refractive index profile by using, in addition, an intermediate tube having a lower refractive index obtained by suitable doping. Quartz-glass tubes manufactured as described above may further be used as envelopes in the manufacture of halogen lamps or gas-discharge lamps, because the types of glass to be used must be, as for the manufacture of optical wave-guides, substantially anhydrous and have a high content of silicon dioxide.

During sintering of the green bodies, it has been found that undesired recrystallization can be prevented when the surface of the green body exhibits a very low degree of roughness, namely $\leq 1$ μm, preferably $\leq 0.5$ μm.

This can be achieved by means of the abovedescribed uncomplicated embodiment of the method and the arrangement, however, in the course of the process certain problems may present themselves. The said problems can be overcome by means of further advantageous embodiment of the method and a modified arrangement.

For this purpose, (see FIG. 2) the starting material 3 for the glass body to be produced is pressed, for example using an extruder (not shown in the Figure) into a synthetic resin disposable mould 25 in the form of a smooth-walled hose, for example, having a diameter of 24 mm and a wall thickness of 20 μm. After it has been filled, the form 25 is place in an ultrsonic bath comprising a vessel 21 and a sound generator or ultrasonic generator 19 which is coupled to the said vessel 21 and a sound transmitting medium 23, for example, water. A sound generator which is suitable for this purpose operates at a frequency of $f=50$ Hz; a suitable ultrasonic generator operates at a frequency of $f=35$ kHz. In such a shearing field, the lowest possible viscosity of the starting material 3 can be attained. As any cavities present can disappear easily, i.e. gas bubbles rise to the surface, a homogeneous green body can be attained having a polished surface in accordance with the inner wall of the house. The compaction of the solids content in the starting material 3 by removal of entrapped gases may be carried out by using a vacuum. A device for producing a vacuum is not shown.

Subsequently, the starting material 3 which has been liquefied, compacted and solidified again in the mould 25 can be further treated (dried) in known manner, after removal of the synthetic resin hose using chemical or mechanical means.

The green body thus obtained, which has a density of from 40 to 60% of the compact quartz glass, remains crack free and is subsequently, as described above, sintered to from transparent glass.

Tubes can be made in the same way if, for example, an additional clamped inner hose having a smaller diameter than the disposable mould 25 is concentrically provided inside the mould 25. The inner hose is stabilized by applying a slight overpressure. After the starting material has solidified and the excess pressure has been relieved, the inner hose can be removed and the tubular green body thus obtained is treated further, as described above.

Figure 3:
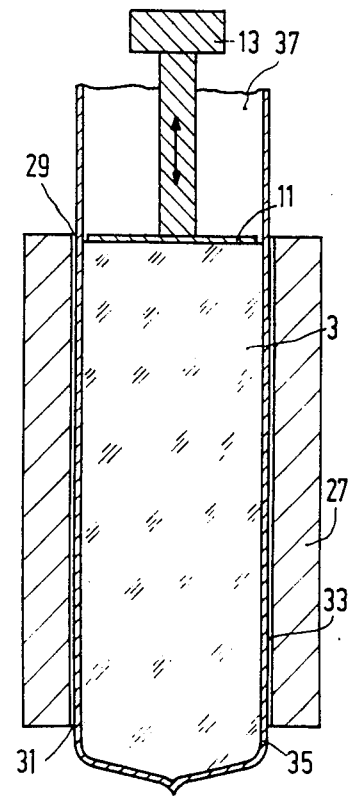
FIG. 3 is a cross-sectional view of an additional arrangement for carrying out the method of the invention.

In a further embodiment of the method in accordance with the invention and making use of a modified arrangement, as shown in FIG. 3, the green body obtained can be dried in the mould in a relatively short time. For this purpose, a lining 35 which is closed on one side and which is made of a material which is water-permeable is positioned along the inner wall 33 of a mould 27 which corresponds to the shape of the glass body to be manufactured, and which comprises a feed opening 29 and perpendicularly opposite thereof an outlet 31. A dialysis hose may advantageously be used for the lining 35. The lining 35 is in close contact with the inner wall 33 of the mould 27 and is filled with the starting material to be liquefied. At its open upper end 37, the space bound by lining 35 is shut off by a plunger 11 which suitably contacts the starting material 3 and which is coupled to a sound generator having a frequency of $f=50$ Hz or to an ultrasonic generator 13 having a frequency of $f=35$ Khz. The mould used for this embodiment is an open divisible tube of high-grade steel having an inside diameter of 21 mm. The inner wall of the mould 27 is suitably polished. Due to the application of the sound field or ultrasonic field, the starting material 3 which is present in the space bound by lining 35 is liquefied by shearing. After deactivating the sound generator or ultrasonic generator, the rapidly solidified starting material 3 in the space bound by lining 35 is removed from the mould along with the lining and dried. After the starting material has dried, the lining 35 is removed and the green body obtained is ready to be sintered to form transparent glass, as described above.

In the manufacture of the starting material, for very pure quartz-glass bodies, which is to be liquefied by means of thixotropy, it has proved very advantageous to disperse $SiO_2$ particles having an average diameter of 40 nm in an aqueous suspension in which the solid/water weight ratio is 1:0.53. An ionogenic additive is added to this suspension in an amount corresponding to 0.75% by weight of the solids content, causing the pH-value of the suspension to move towards alkalinity (pH$\approx$7.5). In the present embodiment, an aqueous 25% ammonia solution is added as an ionogenic additive. In order to solidify the green body to be produced, it may be advantageous to add a binder, e.g. polyvinyl alcohol, in an amount corresponding to approximately 1% of the solids content of the suspension; however, this is not imperative.

Figure 2:
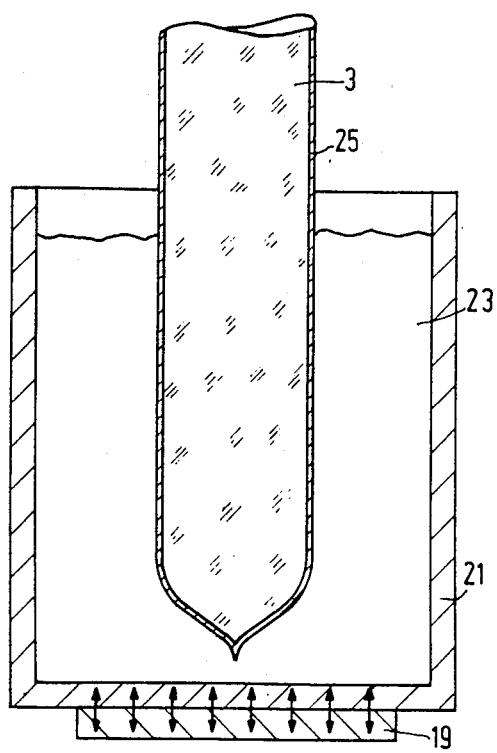
FIG. 2 is a cross-sectional view of a second arrangement for carrying out the method of the invention.

In a practical example of an emobidment using an arrangement in accordance with FIG. 2, the following procedure is adopted: in a kneading machine, 500 grams of commercially available pyrogenic $SiO_2$ having an average, particle size of 40 nm are dispersed in 250 ml of water and 15 ml of an aqueous ammonia solution (25%) until a homogenous, kneadable mass is obtained. By means of an extruder, a part of this highly viscous mass is pressed into a PVC-hose having a diameter of 20 mm, after which the said hose is placed in a tall glass vessel which is filled with water and positioned in a commercially available high-performance ultrasonic apparatus ($f=35$ kHz). After the mass has been sheared in the ultrasonic field for 15 minutes, liquefied and thus homogenized, the mass is removed from the arrangement together with the PVC-hose and immersed in liquid nitrogen at a rate of 5 cm/min. Due to the thixotropy effect, the mass in the hose starts to solifify after a short time, and is completely solid by the time the cooling process begins. After having been exposed to a temperature of <100 K., the brittel PVC-hose is removed and the green body obtained is placed in a glass vessel which is surrounded by ice water. The air surrounding the green body is changed continuously by means of pumps until almost all water is removed from the green body. After a slow drying process of 24 hours, the dried green body having a density of 52%, relative to the density of compact quartz glass, is heated to a temperature of 800° C. in 100 minutes and purified in a flowing oxygen atmosphere containing 6% by volume of chlorine gas for 1.5 hours. In this purification process, impurities in the form of water or transition metals are almost entirely removed; in the purified green body they are present only in the ppb-range. Subsequently, the green body is sintered to form a non-porous and reamless quartz-glass body in a helium atmosphere comprising 2% by volume of chlorine gas, at a temperature of 1500° C., in which process the green body is led through the oven at a speed of 3 mm/min. Thus, a transparent glass rod having a diameter of 14 mm and containing $\leq 50$ ppb of impurities, is obtained. The glass body has a density of 2.20 g/cm$^3$ and a refractive index $n_D$ of 1.4598.

What is claimed is:

1. A method for the manufacture of a porous green body wherein the green body is subsequently purified and sintered to form a glass body, said method comprising introducing a gelled thixotropic suspension of silicon dioxide particles in a dispersion liquid into a mold, liquefying said gel, while in sail mold, by applying mechanical forces to said gel and removing said mechanical forces from the resultant liquefied suspension therby allowing said liquefied thixotropic suspension to gellify to form said green body.

2. A method as claimed in claim 1, characterized wherein a suspension is used as the starting material for the green body, which comprises SiO$_2$ particles having a diameter in the range from 10 to 500 nm.

3. A method as claimed in claim 1, wherein water is used as a dispersing fluid.

4. A method as claimed in claim 1 wherein a suspension is used having a weight ratio between solid and water of from 1:1 to 2.5:1.

5. A method as claimed in claim 1, wherein an ionogenic additive is added to the suspension, which moves the pH-value of the suspension towards acidity (pH<3).

6. A method as claimed in claim 5, wherein the hydrochloric acid HCl is used as an additive.

7. A method as claimed claim 1, wherein an alkaline ionogenic additive is added to the suspension thus causing the pH-value of the suspension to move towards a pH of $\approx 5.5-8$.

8. A method as claimed in claim 7, wherein an ammonia compound is used as the additive.

9. A method as claimed in claim 1, wherein such an amount of an ionogenic additive is added to the suspension that a very viscous, solid gel is obtained.

10. A method as claimed in claim 9, wherein the ionongenic additive is added in an amount between 0.2 and 5% by weight of the solids content of the suspension.

11. A method as claimed in claim 10, wherein an aqueous suspension is used as the thixotropic suspension, which suspension comprises SiO$_2$ particles having an average diameter of 40 nm and a weight ratio between solid and water of 1:0.53, and to which suspension an aqueous 25% ammonia solution is as the ionogenic additive in an amount corresponding to 0.75% by weight of the solids content of the suspension.

12. A method as claimed in claim 1, wherein the gel is liquefied by the application of sound (frequency f=20–200 Hz) or ultrasonics (frequency f=20–50 Khz).

13. A method as claimed in claim 1, wherein the gel is deformed in an arrangement comprising a receptacle in which the gel is liquefied and which is provided with an outlet which determines the shape of the glass body to be manufactured.

14. A method as claimed in claim 1, wherein the gel is liquefied and thin resolidified in a mould which corresponds to the shape of the glass body.

15. A method as claimed in claim 14, wherein the mould is disposable and is destroyed after the starting material has solidified.

16. A method as claimed in claim 15, wherein a synthetic-resin hose is the disposable mould.

17. The method of claim 2 wherein the suspension comprises SiO$_2$ particles having diameters from 15 to 100 nm and an average size diameter of 40 nm.

* * * * *

UNITED STATES PATENT AND TRADEMARK OFFICE
CERTIFICATE OF CORRECTION

PATENT NO. : 4,680,047
DATED : July 14, 1987
INVENTOR(S) : ROLF CLASEN ET AL

It is certified that error appears in the above-identified patent and that said Letters Patent is hereby corrected as shown below:

In the Claims:

Column 7, line 36, "sail" should be --said--.

Signed and Sealed this

Twenty-fourth Day of November, 1987

*Attest:*

DONALD J. QUIGG

*Attesting Officer*  *Commissioner of Patents and Trademarks*